Figure 1:
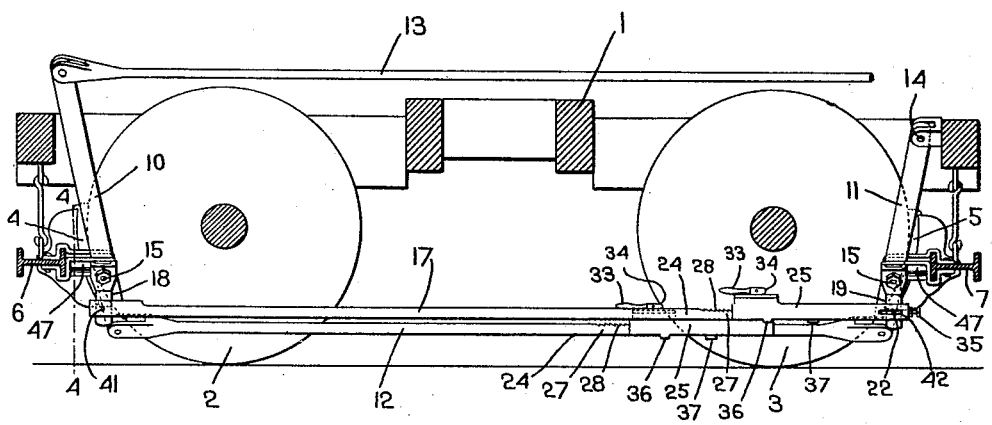

J. S. HARDING.
AUTOMATIC SLACK ADJUSTING DEVICE.
APPLICATION FILED OCT. 16, 1914.

1,120,936. Patented Dec. 15, 1914.

Witnesses.
J. Morrill Fuller
William E. Gagen

Inventor.
Jesse S. Harding,
by Heard Smith & Tennant
Atty's

UNITED STATES PATENT OFFICE.

JESSE S. HARDING, OF STOUGHTON, MASSACHUSETTS, ASSIGNOR OF ONE-HALF TO CHARLES D. DYER, OF WHITMAN, MASSACHUSETTS.

AUTOMATIC SLACK-ADJUSTING DEVICE.

1,120,936.     Specification of Letters Patent.     Patented Dec. 15, 1914.

Continuation of application Serial No. 845,495, filed June 16, 1914. This application filed October 16, 1914. Serial No. 867,008.

*To all whom it may concern:*

Be it known that I, JESSE S. HARDING, a citizen of the United States, residing at Stoughton, county of Norfolk, State of Massachusetts, have invented an Improvement in Automatic Slack-Adjusting Devices, of which the following description, in connection with the accompanying drawing, is a specification, like characters on the drawing representing like parts.

This invention relates to automatic slack adjusters for the brake gear of railway trains. As the brake shoes of a brake gear wear it is necessary to adjust the brake gear to compensate for the wear in order that the brakes may operate properly, and this adjusting operation is now usually performed by hand. Unless great care is used in making the adjustment, the brakes on the several cars of a train will not operate uniformly, in which case the wheels on some of the cars receive very little braking action, while those on other cars may receive sufficient braking action to lock them from rotation, thus causing them to wear flat.

It is the object of an automatic slack adjusting device to provide positively-acting mechanism for automatically adjusting the slack, thus eliminating the personal equation in the matter of making the adjustment. Automatic devices of this character, however, to be available for cars already in use and which are supplied with air brake mechanism of usual type, must be so designed that they can be applied to such cars with comparatively small and inexpensive changes in the old gear thereon. If the application of the automatic devices involves much work, the expense when multiplied by the large number of cars in use by any one corporation is practically prohibitive.

Accordingly my invention has for an object to provide mechanism by which the usual brake gear may be altered to provide automatic adjustment of the slack with comparatively simple changes in the existing mechanism.

The nature and objects of the invention will more fully appear from the following specification and accompanying drawing and the novel features will be particularly pointed out in the claims.

Figure 2:
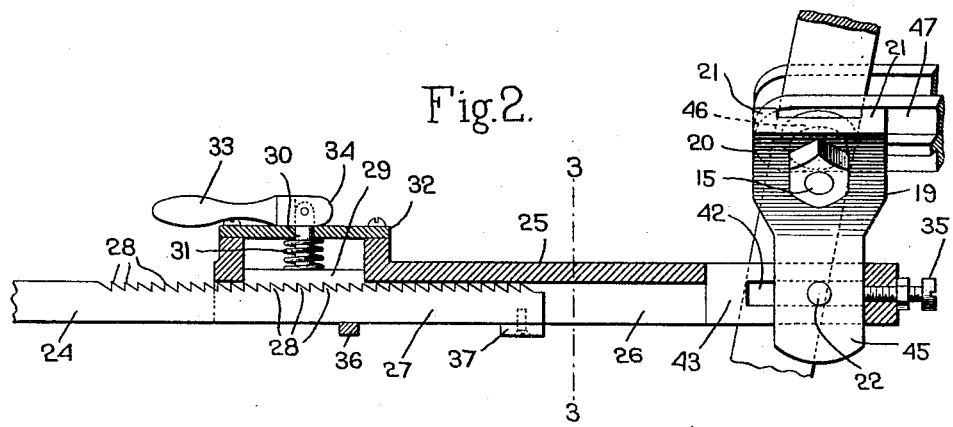
Figure 3:
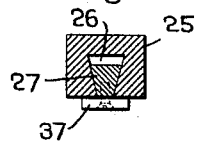
Figure 4:
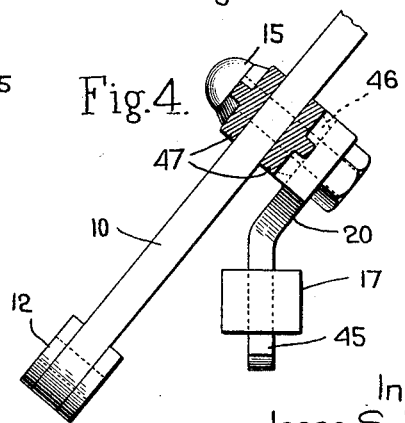

In the drawing in which I have illustrated a selected embodiment of my invention, Figure 1 is a side elevation showing a brake-applying mechanism constructed in accordance with my invention; Fig. 2 is a detail view partly in section of the take-up link; Fig. 3 is a detail view partly in section on the line 3—3, Fig. 2; Fig. 4 is a section on the line 4—4, Fig. 1.

In the drawing I have illustrated a truck 1, of usual construction having wheels 2, 3 to which brake shoes 4, 5 are to be applied. The brake shoes are carried by brake beams 6, 7 supported from the truck in any suitable manner. The brake-operating mechanism comprises the usual live and dead levers 10, 11 with a rod 12 connecting their lower ends and an operating rod 13 connected to the upper end of the live lever and operated by the air cylinder as usual. The dead lever is pivoted to the truck at a fixed point, as indicated at 14, and is pivotally connected to the fulcrum portion 47 of the brake beam 7 by means of a bolt 15 in the usual manner. The live lever is pivotally connected to the fulcrum portion 47 of the brake beam 6 by means of a similar bolt 15.

The construction so far described with the exception of the link 12 is such as is usually employed in air brake mechanism and may be found with comparatively little variation on the majority of cars now using air brakes. The link 12, however, connecting the lower ends of the live and dead levers is in my improved construction automatically adjustable as to its length to provide for taking up the slack in the brake gear to compensate for the wear of the brake shoes, and in the illustrated embodiment of the invention said lever is made in two sections having a telescopic relation to each other, and a pawl-and-ratchet connection to permit telescopic movement in one direction but not in the other. The particular construction by which this end is secured will be more fully herein described. The link 12 is connected to the lower ends of the live and dead levers in the same manner as the link usually employed and may be readily substituted therefor.

Suitable mechanism is provided to cause automatic adjustment or take-up of the link 12 as the brake shoes wear and is so designed that it may be applied without material change in the existing brake gear. In the construction illustrated, this take-up mechanism comprises an automatically-adjustable link 17, connected to the fulcrum portions of the brake beams 6 and 7 in such a manner as to permit a limited movement of one brake beam relative to the link, the connection between said link and said brake beams being such that it can be made without drilling any new holes in either the levers 10 and 11 or in the brake beams and without removing either lever or brake beam from its position on the truck. In the construction illustrated this is accomplished by connecting the link 17 to brackets 18, 19, shown in detail in Figs. 2 and 4, which in turn can be readily bolted to the fulcrum portions 47 of the brake beams. Each bracket has an angular shape and is provided with a head portion 20 having ears 21 that embrace the usual boss 46 found on the underside of the fulcrum member 47 at the point where the bolt 15 is inserted, and with the depending portion 45 to which the link 17 is secured. This angular construction is used because the fulcrum member 47 is usually set on an angle to correspond with the inclined position of the lever, and by making the brackets in this way the portions 45 will occupy vertical positions when the heads 20 are bolted to the inclined under faces of the fulcrum members. With this construction the brackets 18 and 19 can be secured to the fulcrum portions of the brake beams by the same bolts 15 on which the levers 10 and 11 are fulcrumed, and without the necessity of boring any new holes in either the brake levers or brake beams. This is an important item as it provides for attaching the slack adjuster to any existing brake gear without making any changes therein.

The take-up device 17 is pivoted at one end to the bracket 18, as shown at 41, and at the other end is provided with a vertical slot 43 in which the vertical portion 45 of the bracket 19 operates and with a transverse slot 42 in which is received a pin 22 carried by said bracket, the slots 42, 43 permitting a certain amount of play between the take-up device and the bracket 19.

The take-up device as indicated in detail in Fig. 2 is in the form of a link which, in the construction illustrated, is made in two sections 24, 25. The section 25 is provided with a dove-tail slot 26 in its lower side and the member 24 has a wedge-shaped portion 27 which slides in this dove-tail slot, permitting longitudinal adjustment. The upper edge of the section 24 is provided with a series of ratchet teeth as indicated at 28 and a pawl 29 is carried by the member 25 to engage these ratchet teeth 28. In the form illustrated, the pawl 29 is made in the form of a block mounted for vertical movement in a slot in the link 25. This block is provided with a stem 30 surrounded by a spring 31 and extending through a hole in the plate 32. The spring bears against the under side of the plate and urges the pawl toward the ratchet teeth. The pawl may be raised to permit any desired manual adjustment. In the construction illustrated a lever 33 pivoted to the stem 30 and having a cam-shaped end 34 engaging the plate is provided as a convenient means for raising the pawl to releasing position. The block is thus raised sufficiently to be entirely disengaged from the ratchet teeth 28.

I prefer to provide means whereby the amount of relative movement permitted between the section 25 of the take-up link 17 and the bracket 18 may be adjusted and for this purpose as a convenient means I provide a stop screw 35 threaded into the end of the link in position to engage the bracket 19. By this means the amount of play may easily be adjusted to insure proper working of the device under different conditions. The link 12 is similarly made in two sections slidably connected together and provided with pawl-and-ratchet mechanism, the construction being similar to that of the take-up member 17. The sections are each pivotally connected to the end of the corresponding lever in the usual manner.

By having the slots 26 open at the bottom no dirt will collect therein and the device will be kept clean and operative. The link 12 and take-up member 17 are both so constructed that the sections may not be accidentally separated longitudinally. This is accomplished by providing coöperating stops upon the sections, these stops being illustrated as a cross bar 36 formed integral with or secured to the grooved section and a stop 37 secured to the end of the section 24, as illustrated in Fig. 2.

The operation of the device is as follows: When the brakes are applied the pull on the rod 13 draws the lever 10 toward the wheel 2, said lever first turning about its lower end until the brake shoe 4 contacts with the wheel 2, and then turning about its fulcrum 15, thereby operating through the connection 12 to swing the dead lever about its pivot 14 and then apply the brake shoe 5. The slot 43 permits of the necessary movement of the brake beams toward each other to apply the brakes, and this slot is so adjusted as to its length by the screw 35 as to allow of the ordinary movement of the brake beams. As the brake shoes wear, the brake beams will, of necessity, have to be moved nearer together to effect a proper application of the brakes, and this will bring the bracket 19 against the inner end of the slot 43 and thereby cause the sections of the link 17 to telescope the distance of one or more teeth of the ratchet 28. When the brakes are released, the shortened link 17 limits the movement of the brake beams away from each other and as the live and dead levers resume their initial positions the connection 12 becomes correspondingly shortened, thus automatically taking up the slack.

An important feature of my invention is that it provides for applying an automatic slack adjuster to any existing brake rigging without making any changes therein, for the application of my device to a brake rigging involves merely the securing of the brackets 18 and 19 to the fulcrum portions 47 by the bolt 15 and the substitution of the adjustable connection 12 for the one found on the brake rigging.

While I have illustrated a selected embodiment of my invention I do not wish to be limited to the constructional features shown.

I claim:

1. The combination with a truck, of a pair of brake beams having fulcrum portions, live and dead levers pivotally connected to said fulcrum portions, an automatically-adjustable member connecting said levers, brackets fixedly secured to the fulcrum portions, each bracket having an angular shape and presenting an inclined portion overlying the fulcrum portion to which it is attached and a vertically-depending portion, automatically-adjustable take-up mechanism connected to the vertically-depending portions of the brackets, said take-up mechanism comprising a link made in two sections, one of which is pivotally connected to the vertically-depending portion of one bracket, and the other of which is connected to the vertically depending portion of the other bracket in a manner to permit a limited relative movement.

2. The combination with a truck, of a pair of brake beams having inclined fulcrum portions, live and dead levers pivotally connected to said fulcrum portions, an automatically-adjustable member connecting said levers, brackets fixedly secured to the fulcrum portions, each bracket having an angular shape and presenting an inclined portion overlying the fulcrum portion to which it is attached and a vertically-depending portion, automatically-adjustable take-up mechanism connected to the vertically-depending portions of the brackets, said take-up mechanism comprising a link made in two sections, one of which is pivotally connected to the vertically-depending portion of one bracket and the other of which is provided with a vertical slot through which the vertically-depending portion of the other bracket passes, and with a horizontal slot intersecting said vertical slot, a pin carried by said last-mentioned bracket adapted to operate in said horizontal slot whereby limited relative movement is permitted.

3. In combination, a truck, a pair of brake beams, a live lever connected to one brake beam, a dead lever connected to the other brake beam, an automatically-adjustable rod connecting the levers, an automatically-adjustable take-up device connecting the brake beams and capable of a limited movement relative to one brake beam and comprising a link made in two sections, one section being provided with a dove-tail slot open upon the lower side of said section, the other section being provided with a wedge-shaped portion slidable in said dove-tail slot and having ratchet teeth upon one face thereof, a block movable in the first-mentioned section and arranged to engage said ratchet teeth to hold the sections against relative movement in one direction, and a lever connected to said block and arranged to raise said block out of engagement with the ratchet teeth.

4. In combination, a truck, a pair of brake beams, a live lever connected to one brake beam, a dead lever connected to the other brake beam, an automatically-adjustable rod connecting the levers, said rod being made in two sections slidably connected together, one section being provided with a dove-tail slot open on the lower side thereof, the other section being provided with a portion fitting in said dove-tail slot and having ratchet teeth upon one face thereof, a pawl connected with said first section and arranged to engage the ratchet teeth to permit relative movement of said sections in one direction but to prevent relative movement of said sections in the other direction and automatic take-up mechanism to cause relative movement of said sections in one direction under predetermined conditions.

5. In combination, a truck, a pair of brake beams, a live lever connected to one brake beam, a dead lever connected to the other brake beam, an automatically-adjustable member connecting the levers, an automatically-adjustable take-up device connecting said brake beams and capable of a limited movement relative to one brake beam, said device comprising a link made in two sections slidably connected together, one section being provided with a slot open upon the lower side thereof, the other section having a portion slidable in said slot and shaped to be retained therein, said section being also provided with ratchet teeth and a pawl connected to said first section and arranged to connect said ratchet teeth to hold the section against relative movement in one direction, but permitting movement in the other direction, said sections being provided with coöperating stops to prevent accidental separation thereof.

In testimony whereof, I have signed my name to this specification, in the presence of two subscribing witnesses.

JESSE S. HARDING.

Witnesses:
 LOUIS C. SMITH,
 THOMAS J. DRUMMOND.

Copies of this patent may be obtained for five cents each, by addressing the "Commissioner of Patents, Washington, D. C."